Oct. 5, 1971        W. H. TOPHAM        3,610,026

HYDRAULIC RESISTANCE

Filed Aug. 6, 1969        2 Sheets-Sheet 1

INVENTOR:
WILLIAM HENRY TOPHAM
By: Morgan, Finnegan, Durham & Pine
Attorneys

Oct. 5, 1971  W. H. TOPHAM  3,610,026
HYDRAULIC RESISTANCE
Filed Aug. 6, 1969  2 Sheets-Sheet 2
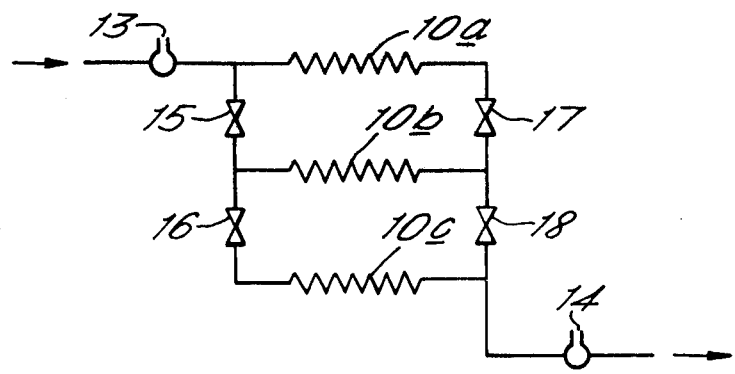
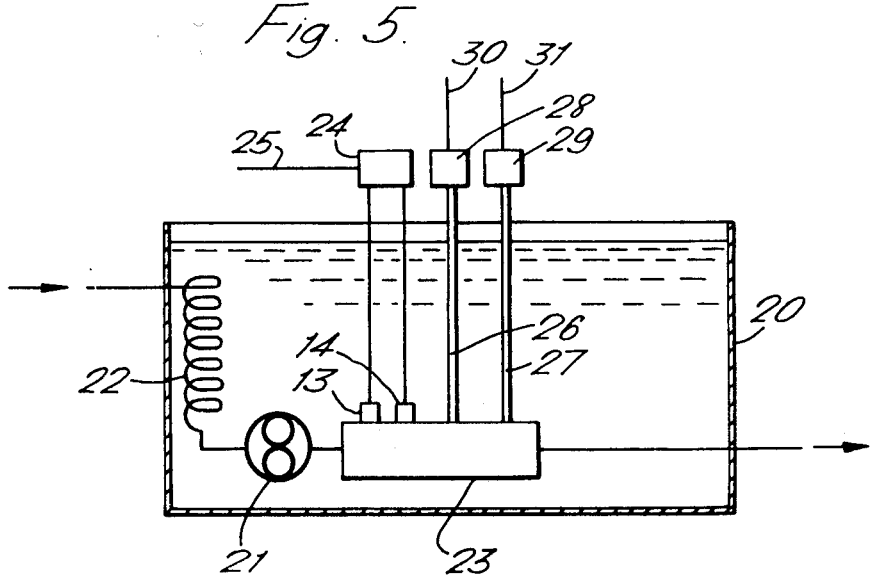
INVENTOR
WILLIAM HENRY TOPHAM
By Morgan, Finnegan, Durham & Pine
Attorneys United States Patent Office 3,610,026
Patented Oct. 5, 1971

3,610,026
HYDRAULIC RESISTANCE
William Henry Topham, Rochester, Kent, England, assignor to The British Petroleum Company Limited, London, England
Filed Aug. 6, 1969, Ser. No. 847,943
Claims priority, application Great Britain, Sept. 9, 1968, 42,793/68
Int. Cl. G01n *11/08*
U.S. Cl. 73—55                    7 Claims

ABSTRACT OF THE DISCLOSURE

An on-stream viscometer consists of a plurality of resistive elements connected either in series or in parallel and at least one valve for varying the effective flow path through the resistance. The pressure drop, as measured across the resistance, is a measure of the viscosity of the fluid flowing through the system.

---

This invention relates to a hydraulic ressitance for use in viscometers.

It is known to measure the viscosity of a liquid by passing a sample through a hydraulic resistance and measuring the volume flow rate through and the pressure drop across the hydraulic resistance. The measurement of the volume flow rate is usually carried out by the use of a constant volume flow rate pump. It is an object of this invention to improve the flexibility of this type of viscometer.

According to the invention a hydraulic resistance, suitable for use in a viscometer of the type which obtains viscosity measurements from measurements of the pressure drop across and the flow rate through a hydraulic resistance, is formed of a plurality of resistive elements and at least one valve for varying the effective flow path through the hydraulic resistance.

There are four main variants, namely:

Series: In this arrangement the elements are connected in series and a low resistance shunt containing an on/off valve is connected in parallel with all, or preferably all but one, of the elements.

Parallel: In this arrangement the elements are connected in parallel and an on/off valve is connected in series with all, or preferably all but one, of the elements.

(Series/parallel arrangements with both shunts and series valves are possible.)

Variable pressure-reading points: In this arrangement the hydraulic resistance comprises a plurality of pressure paths, each incorporating a valve which enables a pressure measuring instrument to be connected in parallel with different portion of the resistive elements.

Variable path arrangements in which the ends of the elements are interconnected via low resistance tubes with valves.

Preferably each resistive element is a single tube 50–500 cm. in length with a bore of circular cross section having an internal diameter 1–5 mm.

The invention also includes a vismometer which comprises a hydraulic resistance as defined above, means for measuring the flow rate through the resistance, a pressure measuring instrument (e.g. a pressure transducer) for measuring the pressure drop across the resistance and a thermostat for maintaining the vismometer and any sample contained therein at a specified temperature.

Conveniently the means for measuring the flow rate takes the form of a constant volume flow rate pump.

Viscometers of this type are suitable for use on-stream since they produce a signal which can be used for closed loop control.

Figure 1:
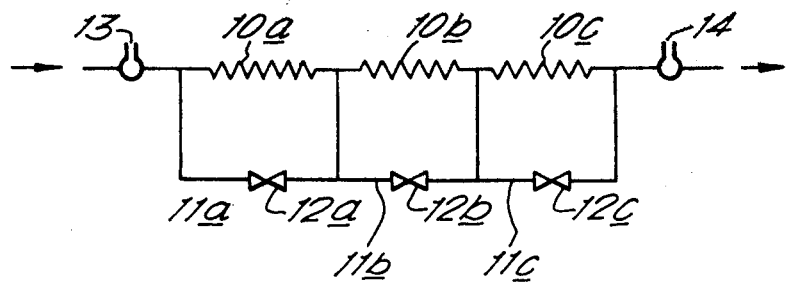
Figure 2:
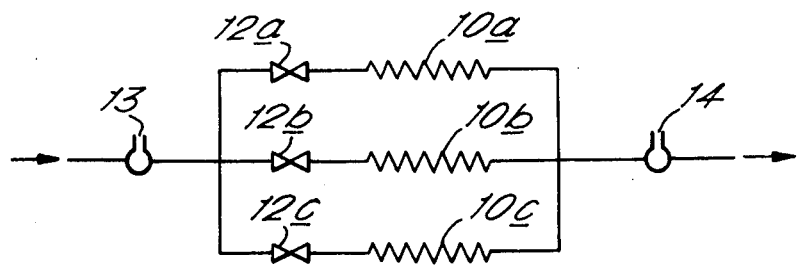
Figure 3:
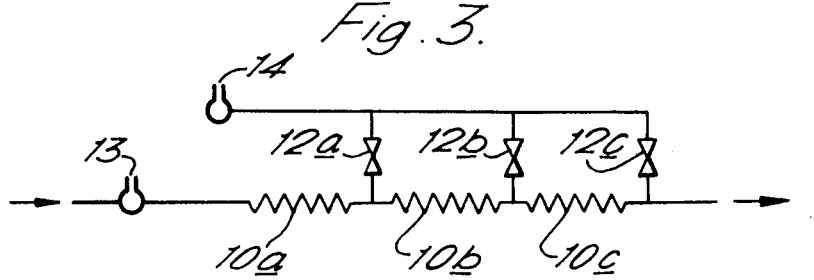

The invention will now be described by way of example with reference to the accompanying drawings in which FIG. 1 illustrates in diagrammatic form a hydraulic resistance formed of series-connected elements with shunts, FIG. 2 illustrates in diagrammatic form a hydraulic resistance formed of parallel-connected elements with series valves, FIG. 3 illustrates in diagrammatic form a hydraulic resistance with variable reading points, FIG. 4 illustrates in diagrammatic form a hydraulic resistance with a variable path arrangement, and FIG. 5 illustrates in diagrammatic form an on-stream viscometer which comprises a hydraulic resistance as shown in any one of FIGS. 1–4.

The hydraulic resistance shown in FIG. 1 comprises three resistive elements 10a, 10b and 10c connected in series. A low resistance shunt 11a with a valve 12a is connected in parallel with the resistive element 10a; similar shunts 11b and 11c, with valves 12b and 12c, are connected in parallel with resistive elements 10b and 10c respectively. The hydraulic resistance also comprises connection points 13 and 14 to which a pressure measuring instrument is connected when the resistance is incorporated in a viscometer. It is apparent that suitable switching of the valves enables any series combination of the resistive elements (including a "short") to be achieved.

The hydraulic resistance shown in FIG. 2 comprises three resistive elements 10a, 10b and 10c connected in parallel; each element has a valve, numbered 12a, 12b and 12c respectively, connected in series with it. It also comprises connection points 13 and 14 to which a pressure recorder is connected when the resistance is incorporated in a viscometer. It is apparent that suitable switching of the valves enables any parallel combination of the resistive elements (including complete disconnection) to be achieved.

The hydraulic resistance shown in FIG. 3 is similar to that shown in FIG. 1 in that it comprises three resistive elements 10a, 10b and 10c connected in series. The connection point 13 is situated in the inlet but the connection point 14 can be connected:

(a) To measure the pressure drop across 10a by opening the valve 12a
(b) To measure the pressure drop across 10a and 10b in series by closing valve 12a and opening the valve 12b
(c) To measure the pressure drop across 10a, 10b and 10c in series by closing valves 12a and 12b and opening valve 12c (The state of the unspecified valves makes no difference; thus FIG. 3 gives only three values for the resistance against a possible seven for FIG. 1.)

The hydraulic resistance shown in FIG. 4 comprises three resistance elements 10a, 10b and 10c whose inlet ends are connected via valves 15 and 16 and whose outlet ends are connected via valves 17 and 18. Suitable switching of the valves enables the following networks to be achieved:

(a) any single element
(b) element 10a in parallel with element 10b
(c) element 10b in parallel with element 10c
(d) all elements in parallel
(e) all elements in series (Note no "shorts" or "disconnections" are possible.)

All the resistance shown in FIGS. 1–4 contain three elements and so a designer can specify three resistance values and design a network to give them. It is emphasised that it is impossible to *specify* more than three values (unless more than three resistive elements are used) even though the arrangements shown in FIGS. 1, 2 and 4 give more than three usable networks; the extra networks give "bonus values" which cannot be fixed by the designer since they are fixed by the specified values.

Thus FIGS. 1 and 2 represent three specified and four bonus values; in many applications so many bonus values are not of sufficient worth to justify three values and therefore one is conveniently omitted.

Each resistive element shown in FIGS. 1–4 is a circular cross section capillary tube of dimensions 100 cm. long and 3–4 mm. internal diameter.

The viscometer shown in FIG. 5 comprises a thermostatic oil bath 20 for maintaining the sample at the required temperature. (The thermostatic oil bath 20 includes conventional components, e.g. heater, thermometric element for controlling the heater and a stirrer. These components are not shown in any drawing.)

The bath 20 contains a pump 21 (which pumps liquid at a constant flow rate), a heat exchanger 22 (which enables the sample to achieve the required test temperature) and a hydraulic resistance 23 as shown in any one of FIGS. 1–4. A pressure transducer 24 is situated outside the bath 20 and it is connected so as to produce an electric signal which represents the difference in pressure between the connection points 13 and 14 (see FIGS. 1–4) of the hydraulic resistance 23; the signal is transmitted via the line 25.

The hydraulic resistance 23 is a two-valve version of FIG. 1 or FIG. 2 and valve actuating spindals 26 and 27 pass out of the bath 20 to connect with pneumatic actuators 28 and 29 controlled by air lines 30 and 31; for hydraulic resistances which have more than two valves extra actuators and air lines are needed.

During use a portion of the output of a plant is diverted through the viscometer so that the pressure transducer produces a signal which gives a continuous measurement of the viscosity of the product. The signal can be used to obtain closed loop operation.

If the viscosity of the fluid varies too much the pressure difference between the connection points 13 and 14 may not be within the range of the transducer 24. In this case operation of the actuators 28 and 29 changes the value of the hydraulic resistance 23 so that a more suitable pressure difference is obtained.

(The viscometer is particularly intended for use in oil refineries where there is a potentially hazardous atmosphere, e.g. an explosive mixture of hydrocarbons and air could form. For such applications it should be placed in an explosion proof chamber, e.g. a pure air purged box.)

I claim:
1. A viscometer for determining the viscosity of a liquid, comprising:
    (a) a hydraulic resistance through which a sample of the liquid whose viscosity is to be measured is to be passed, said hydraulic resistance having a plurality of resistive elements for providing a variable pressure path for the flow of the liquid sample through the resistance and having also at least one valve for varying the effective pressure path provided by the resistive elements;
    (b) a constant volume flow rate pump for passing the sample of liquid through the hydraulic resistance;
    (c) means for measuring the pressure drop across said hydraulic resistance, said means comprising a pressure transducer connected across said hydraulic resistance for producing a signal which represents the difference in pressure between the connection points; and
    (d) thermostatically controlled heat-transfer means associated with said hydraulic resistance for maintaining the liquid sample passing through the hydraulic resistance at a required temperature, whereby viscosity measurements of said liquid sample may be obtained from measurements of the pressure drop across, and the liquid flow rate through, said hydraulic resistance.

2. A viscosimeter according to claim 1, in which the resistive elements are connected in series and a low resistance shunt containing an on/off valve is connected in parallel with each element.

3. A viscosimeter according to claim 1, in which the resistive elements are connected in series and a low resistance shunt containing an on/off valve is connected in parallel with each element in excess of one.

4. A viscosimeter according to claim 1, in which the resistive elements are connected in parallel and an on/off valve is connected in series with each element.

5. A viscosimeter according to claim 1, in which the resistive elements are connected in parallel and an on/off valve is connected in series with each element in excess of one.

6. A viscosimeter according to claim 1, which comprises a plurality of pressure paths, one for each resistive element, each path incorporating an on/off valve and said paths being connected in parallel and to the respective elements, which enable a pressure measuring instrument to be connected in parallel with different portions of the elements.

7. A viscosimeter according to claim 1 in which each resistive element is a single tube 50–500 cm. in length with a bore of circular cross section having the internal diameter 1–5 mm.

References Cited
UNITED STATES PATENTS

| | | | |
|---|---|---|---|
| 2,589,251 | 3/1952 | Heinz | 73—54 X |
| 3,024,643 | 3/1962 | Jones, Jr. | 73—55 |
| 3,086,386 | 4/1963 | Kapff | 73—54 X |
| 3,116,630 | 1/1964 | Piros | 73—55 |
| 3,302,451 | 2/1967 | Martin | 73—55 |
| 3,330,156 | 7/1967 | Thomas | 73—205 X |
| 3,468,158 | 9/1969 | Chien | 73—55 |

LOUIS R. PRINCE, Primary Examiner

J. W. ROSKOS, Assistant Examiner

U.S. Cl. X.R.

73—205 L

PO-1050
(5/69)

UNITED STATES PATENT OFFICE
CERTIFICATE OF CORRECTION

Patent No. 3,610,026     Dated October 5, 1971

Inventor(x)   William Henry Topham

It is certified that error appears in the above-identified patent and that said Letters Patent are hereby corrected as shown below:

| | | |
|---|---|---|
| Col. 1, Line 22, for "ressitance" | read | -- resistance -- |
| Col. 1, Line 53, for "portion" | read | -- portions -- |
| Col. 1, Line 60, for "vismometer" | read | -- viscometer -- |
| Col. 1, Line 65, for "vismometer" | read | -- viscometer -- |
| Col. 3, Line 19, for "constant flow rate" | read | -- constant volume flow rate -- |

Signed and sealed this 23rd day of May 1972.

(SEAL)
Attest:

EDWARD M. FLETCHER, JR.        ROBERT GOTTSCHALK
Attesting Officer              Commissioner of Patents